United States Patent
Paul

(10) Patent No.: US 10,919,654 B2
(45) Date of Patent: Feb. 16, 2021

(54) SEALING TOOL WITH RECESS AND TRANSITION REGION

(71) Applicant: GEA Food Solutions Germany GmbH, Biedenkopf-Wallau (DE)

(72) Inventor: Reiner Paul, Steffenberg (DE)

(73) Assignee: GEA Food Solutions Germany GmbH, Biedenkopf-Wallau (DE)

( * ) Notice: Subject to any disclaimer, the term of this patent is extended or adjusted under 35 U.S.C. 154(b) by 113 days.

(21) Appl. No.: 16/070,307

(22) PCT Filed: Jan. 10, 2017

(86) PCT No.: PCT/EP2017/050396
§ 371 (c)(1),
(2) Date: Jul. 16, 2018

(87) PCT Pub. No.: WO2017/125282
PCT Pub. Date: Jul. 27, 2017

(65) Prior Publication Data
US 2019/0016489 A1 Jan. 17, 2019

(30) Foreign Application Priority Data

Jan. 20, 2016 (DE) .................. 10 2016 200 673

(51) Int. Cl.
*B65B 47/10* (2006.01)
*B65B 9/04* (2006.01)
(Continued)

(52) U.S. Cl.
CPC ............ *B65B 11/52* (2013.01); *B29C 51/303* (2013.01); *B29C 51/36* (2013.01); *B65B 7/164* (2013.01);
(Continued)

(58) Field of Classification Search
CPC ............ B65B 7/164; B65B 9/04; B65B 11/50; B65B 11/52; B65B 31/028; B65B 47/02;
(Continued)

(56) References Cited

U.S. PATENT DOCUMENTS 1,553,560 A * 9/1925 Schaefer ............... B29C 51/267
425/235
4,282,699 A * 8/1981 Embro, Jr. ............... B65B 7/164
53/298

(Continued)

FOREIGN PATENT DOCUMENTS

| CN | 105143052 A | 12/2015 |
| EP | 2251265 A2 | 11/2010 |

(Continued)

OTHER PUBLICATIONS

International Search Report for International Application No. PCT/EP2017/050396, dated Jul. 20, 2017.

(Continued)

*Primary Examiner* — Stephen F. Gerrity
(74) *Attorney, Agent, or Firm* — The Dobrusin Law Firm, P.C.

(57) ABSTRACT

An upper sealing tool that includes a peripheral region and a recess, by way of which an upper film web is formed. The recess has a transition region and an inner region. The recess has a depth measured between the peripheral region and the inner region. The transition region has a first portion and a second portion. The first portion is provided in a convex state and the second portion is provided in a concave state. A ratio of the depth of the recess to a radius of curvature of the first portion is ≤2.5. A ratio of the depth of the recess to a radius of curvature of the second portion is ≤2.5.

12 Claims, 3 Drawing Sheets

(51) Int. Cl.
    *B65B 7/16*         (2006.01)
    *B65B 11/52*       (2006.01)
    *B29C 51/36*       (2006.01)
    *B65B 31/02*       (2006.01)
    *B29C 51/30*       (2006.01)
    *B65B 47/02*       (2006.01)
    *B65B 51/10*       (2006.01)
    *B29L 31/00*       (2006.01)

(52) U.S. Cl.
    CPC ............ *B65B 9/04* (2013.01); *B65B 31/024* (2013.01); *B65B 31/028* (2013.01); *B65B 47/02* (2013.01); *B65B 47/10* (2013.01); *B65B 51/10* (2013.01); *B29L 2031/712* (2013.01); *B65B 2220/14* (2013.01); *B65B 2230/02* (2013.01)

(58) Field of Classification Search
    CPC ....... B65B 47/08; B65B 47/10; B29C 51/303; B29C 51/36; B29C 51/365
    USPC ............. 53/427, 509, 511, 559, 329.2, 329.3
    See application file for complete search history.

(56) References Cited

U.S. PATENT DOCUMENTS

| | | | |
|---|---|---|---|
| 4,621,483 A | 11/1986 | Magid | |
| 4,897,985 A * | 2/1990 | Buchko et al. | ........... B65B 9/02 53/553 |
| 5,560,182 A * | 10/1996 | Garwood | ............. B65B 31/028 426/118 |
| 8,544,245 B2 | 10/2013 | Ehrmann et al. | |
| 10,414,567 B2 | 9/2019 | Palumbo | |
| 2003/0196412 A1 * | 10/2003 | Foulke, Jr. | ............. B65B 31/028 53/432 |
| 2010/0115890 A1 * | 5/2010 | Granili | .................. B65B 31/028 53/427 |
| 2014/0331611 A1 * | 11/2014 | Meyer et al. | ............. B65B 9/04 53/445 |
| 2015/0027090 A1 | 1/2015 | Runte | |
| 2016/0068291 A1 | 3/2016 | Paul | |
| 2018/0022490 A1 * | 1/2018 | Harrison et al. | ........ B65B 11/52 53/403 |
| 2018/0170594 A1 * | 6/2018 | Speck et al. | ............ B65B 11/50 |

FOREIGN PATENT DOCUMENTS

| | | |
|---|---|---|
| EP | 2285706 A1 | 2/2011 |
| EP | 2722281 A2 | 4/2014 |
| EP | 2722281 A3 | 7/2014 |
| EP | 2815983 A1 | 12/2014 |
| WO | 2009/141214 A1 | 11/2009 |
| WO | 2013/127963 A1 | 9/2013 |

OTHER PUBLICATIONS

Written Opinion for International Application No. PCT/EP2017/050396, dated Jul. 20, 2017.
European Examination Report for European Application 17700399.3; dated Jan. 27, 2020.
Chinese First Office Action for Chinese Application 201780007415.3, dated May 7, 2020.

* cited by examiner

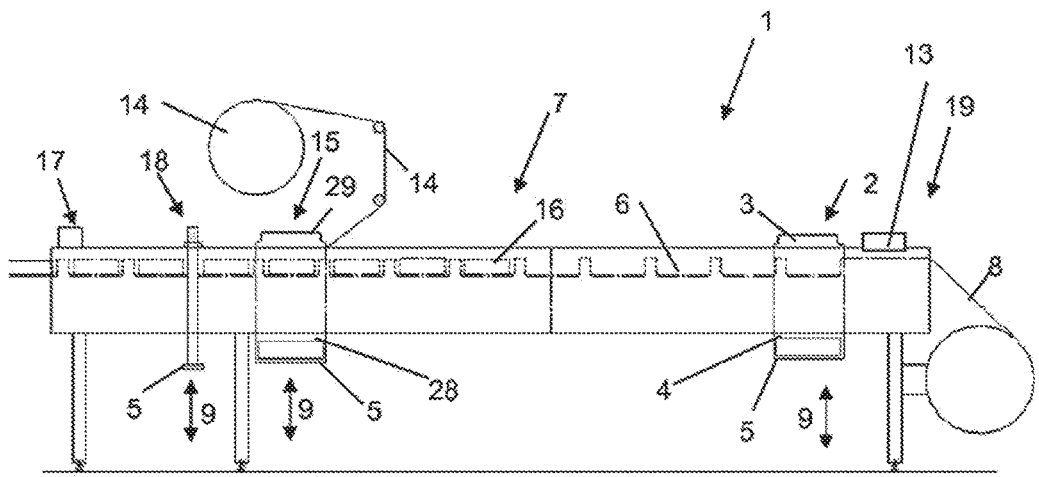
Fig. 1
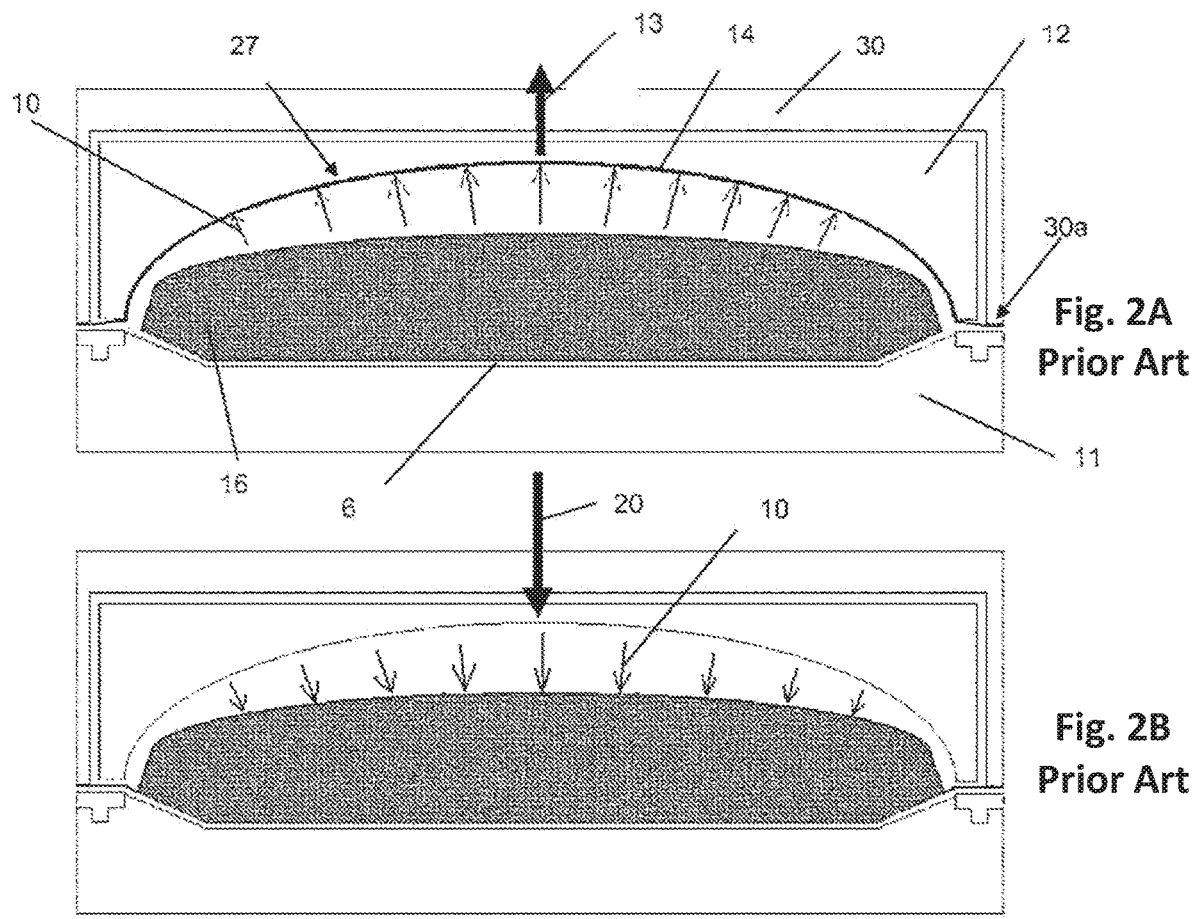
Fig. 2A
Prior Art
Fig. 2B
Prior Art

SEALING TOOL WITH RECESS AND TRANSITION REGION

FIELD

The present invention relates to an upper sealing tool which has a peripheral region and a recess, by way of which the upper film web is formed, wherein the recess has a transition region and an inner region, wherein the transition region is located between the peripheral region and the inner region. The present invention also relates to a packaging machine and a method for producing a skin pack.

BACKGROUND

The upper film web of skin packs butts directly against the pack contents, follows, at least to some extent, the contour of the pack contents and is connected to the pack cavity, on which the pack contents are located, over a large surface area. It is often the case, however, that the upper film has creases and/or the packaging machines are of complex configuration, because it is necessary for the upper film web to be preheated, prestretched/predeformed and/or guided.

SUMMARY

It was therefore the object of the present invention to provide an upper sealing tool which can be used to overcome the disadvantages of the prior art.

The object is achieved by an upper sealing tool which has a peripheral region and a recess, by way of which the upper film web is formed, wherein the recess has a transition region and an inner region, wherein the transition region is located between the peripheral region and the inner region and has a first and a second portion, wherein one portion is provided in a convex state and the other portion is provided in a concave state, and wherein the ratio of the depth of the recess to the radius of curvature of the one portion, and preferably also to the radius of curvature of the other portion, is, at least in part, ≤2.5, preferably ≤2 and even more preferably ≤1.

What is said in relation to this subject matter applies equally to the other subjects of the present invention, and vice versa.

The present invention relates to an upper sealing tool which has a peripheral region and a recess, into which an upper film is drawn by suction, and formed in the process. The upper film is preferably fixed, during deformation, in the peripheral region, and/or preferably by way of a surrounding housing/damping tool, and the peripheral region and/or the surrounding housing/clamping tool preferably seal/seals the space between the recess and the upper film. The upper sealing tool according to the invention is preferably heated. During deformation, the originally planar film web positions itself against the contour of the recess and is heated in the process, in particular by thermal conduction. The peripheral region is preferably provided in a planar state. The inner circumference of the peripheral region is adjoined by the recess, which has a transition region and an inner region. It is preferably the case that the inner region at least in part, is essentially planar and particularly preferably parallel to the peripheral region. The transition region is provided between the peripheral region and the inner region. The peripheral region and the transition region merge one into the other preferably without any bends, in order to achieve preferably uniform expansion, in particular no over-expansion, of the upper film in this region. The upper sealing tool, in particular in the region of the recess, preferably has a multiplicity of bores and/or is produced from a porous material, and therefore the upper sealing tool is gas-permeable and it is possible to generate through the upper sealing tool, between the recess and the upper film, a negative pressure which draws the upper film into the recess, and in the process forms, and particularly preferably heats, the upper film. The recess has a certain depth, calculated from the difference between the peripheral region and the inner region.

According to the invention, then, the transition region has a first and a second portion, wherein one portion is provided in a convex state and the other portion is provided in a concave state. The portions extend preferably in planes parallel to the peripheral region and/or the inner region. The first, preferably convex, portion adjoins the peripheral region and the second, preferably concave, portion adjoins the inner region. According to the invention, the ratio of the depth of the recess to the radius of curvature of the first portion, and preferably also to the radius of curvature of the second portion is, at least in part, ≤2.5, preferably ≤2 and even more preferably ≤1. The lower limit is preferably ≥0.1, particularly preferably ≥0.2, even more preferably ≥0.3 and most preferably ≥0.5.

The upper sealing tool according to the invention makes it possible to provide skin packs using a significantly more straightforward packaging machine, which requires no pre-stretching/predeforming step and/or preheating step for the upper film. Accordingly, it is possible for the non-heated, planar upper film to be deformed in the upper sealing tool according to the invention. The upper film is stretched and/or deformed here significantly more uniformly than on upper sealing tools from the prior art. The upper film positions itself over its entire surface area against the recess of the upper sealing tool and is thus heated uniformly. Since the upper film is not preheated or prestretched, the amount of energy required for producing a skin pack is comparatively low. The upper sealing tool according to the invention makes it possible for a dome of a depth of up to 50 mm, preferably up to 80 mm, particularly preferably up to 100 mm, to be formed in the cold, non-heated upper film without the upper film tearing or being subjected to local over-expansion. Guidance of the upper film, for example by lateral chains, can be dispensed with as a result of the upper sealing tool according to the invention. A conventional packaging machine can be straightforwardly retrofitted with the upper sealing tool according to the invention to give a "skin packaging machine" by virtue of the conventional upper sealing tool being replaced by the upper sealing tool according to the invention.

The conversion is by made possible by modular construction of the upper sealing tools and takes place preferably in the manner of rapid tool changeover, for example using a tool design like that described in WO 2013127963 A1 from the same applicant, wherein the upper tool remains in the packaging machine and it is only the tool insert within, that is to say the upper sealing tool, which is changed over. It is therefore possible for the upper sealing tool according to the invention to be retrofitted in existing packaging machines. A person skilled in the art will be aware that the upper sealing tool, in this case, can be a tool for skin packs or a conventional tool for example for so-called "modified atmosphere packagings" (MAP) or vacuum packs, or simple packs without any modified atmosphere, and makes it possible for the user of the packaging machine to pack different products with different uses. Each of these tools can be readily installed in the packaging machine, and therefore the latter can be used in a versatile manner.

A further subject matter according to the invention, or preferred subject matter of the present invention, is a packaging-machine sealing station in which are provided a plurality of, at least two, upper sealing tools, each with a recess, wherein the recesses differ in respect of at least one dimension.

What is said in relation to this subject matter applies equally to the other subjects, and vice versa.

Packaging machines thus equipped can be used to produce one or more packs in a single procedure, wherein it is possible to provide products with different dimensions and, for this purpose, to combine in each case the appropriate sealing tools with different depths.

It is preferably possible for the upper sealing tools to be combined with one another and/or changed over as desired.

A further subject matter according to the invention, or preferred subject matter of the present invention, is an upper sealing tool in which the transition region has a first and a second portion, wherein one portion is provided in a convex state and the other portion is provided in a concave state, the radius of curvature of said portions being, at least in part, ≥8 mm, preferably a 15 mm and even more preferably ≥20 mm and most preferably ≥30 mm.

What is said in relation to this subject matter applies equally to other subjects, and vice versa.

However, the radius of curvature is preferably ≤160 mm, particularly preferably ≤120 mm, even more preferably ≤80 mm and even more preferably ≤60 mm.

The inner contour of the upper sealing tool according to the invention is configured differently to the film-contact region of the inner contour of a lower tool used for example in the forming station of a packaging machine. According to the prior art, up until now, the contour of the recess of the upper sealing tool of the skin packaging machine has been configured in essentially the same way as the contour of the lower sealing tool of the sealing station and/or of the lower forming tool of the forming station. This is not the case, however, with the upper sealing tool according to the invention. Preferably, the recess of the upper sealing tool is configured to be narrower all the way round than the lower sealing tool of the sealing station and/or of the lower forming tool of the forming station and, particularly preferably, it is guided up into very close proximity to the product, although contact should be avoided. It is thus possible for the first portion of the transition region, which adjoins the inner contour of the peripheral region, to be configured preferably with a large radius of curvature, which is preferably ≥1.3, particularly preferably ≥22.0, even more preferably ≥3.0 or most preferably ≥5.0 times greater than the radii of curvature proposed by the prior art. The typical situations where the non-preheated upper film possibly tears or the upper film is subjected to over-expansion, which results in creasing, are done away with. In addition, the formation of a contour which is based, at least in part, closely on the shape of the product, means that the upper film then has a lesser tendency to form creases over the product, which has a positive effect on the quality of the appearance of the pack and the tightness of the sealing.

The first and/or the second portion are/is preferably provided in the form of an all-round surface. According to another preferred embodiment, in the case of a recess with a rectangular base surface area, it is only the long sides and/or only the corners which are provided with a ratio according to the invention of depth to radius of curvature and/or with the radius of curvature according to the invention.

The transition region of the recess is preferably configured such that the radii of the two portions merge one into the other, wherein it is also possible for a recess, for example a bend, to be present at the point or line where the two portions meet. The two flanks of the bend preferably define an angle <180° and ≥30°, particularly preferably ≥35°. The transition region, then, has no rectilinear, non-curved portion at least locally, but preferably along the entire circumference of the recess.

For a recess with a rectangular base surface area, it is preferably also the case that the corner regions, which connect together two transition-region surfaces provided at right angles, are likewise configured with a radius of curvature of ≥10 mm, preferably ≥20 mm and even more preferably ≥40 mm and most preferably a ≥60 mm. A person skilled in the art will understand that, in these corner regions, the radius of curvature changes along with the height of the pack cavity if the transition surfaces are not provided at right angles to the inner region. The information given above refers to the radius of curvature in the first convex portion of the transition region.

According to a preferred embodiment of the present invention, the convex radius of curvature is smaller than the concave radius of curvature.

It is preferably the case that, at least in part, the upper sealing tool is provided with apertures and/or is made from a porous material. The apertures or the porous material here are/is provided in particular in the region of the recess, so that the upper sealing tool is gas-permeable at least in this region, and therefore it is possible to apply, between the recess and the upper film, a negative pressure which draws the upper film into the recess, and/or by means of which the region between the recess and the upper film can have air admitted to it and/or can be provided with a positive pressure.

The depth of the recess is preferably more than 30 mm, preferably more than 40 mm and particularly preferably 50-70 mm.

A further subject matter of the present invention is a packaging machine having a pack cavity with a recess of maximum cross section, the pack cavity being filled with pack contents in a filling station, and having a sealing station, in which the pack contents are enclosed at least essentially in a form-fitting manner by an upper film, wherein the sealing station has an upper sealing tool with a recess of maximum cross section, the latter recess heating and forming the upper film, wherein the maximum cross section of the recess is smaller than a maximum cross section of the recess of the pack cavity.

What is said in relation to this subject matter of the present invention applies equally to the other subjects, and vice versa.

The present invention relates to a packaging machine having a pack cavity. The pack cavity can be provided by virtue of being formed in a planar film web or of a prefabricated pack cavity being supplied. The packaging machine according to the invention may thus be, for example, a so-called thermoformer or also a so-called traysealer. Said pack cavity has a maximum cross section, which is often located at the upper end of the pack cavity. This is usually the cross section through which the pack cavity is filled and/or which is located in the sealing plane of the pack cavity and is located opposite the base of the pack cavity. In a following step, said pack cavity is filled with pack contents, in particular a foodstuff, preferably a foodstuff containing protein. It is possible here for the pack contents to project beyond the upper periphery of the pack cavity. According to the invention, the packaging machine has a sealing station, in which the pack contents are enclosed at least essentially in a form-fitting manner by an upper film. Packs in which the pack contents are provided in a comparatively stiff pack cavity, and in which the pack contents are enclosed essentially in a form-fitting manner by an upper film, are referred to by a person skilled in the art as so-called skin packs. The upper film here is connected over a large surface area, particularly preferably over a very large surface area, to the pack cavity, in particular to the entire pack-cavity surface which is directed towards the upper film and is not covered over by the pack contents.

The sealing station has an upper sealing tool with a recess of maximum cross section. This cross section is usually located on the plane which is defined by the peripheral region of the upper sealing tool. This tool is located above the pack cavity and, within the sealing station, also above the upper film. The upper film is drawn into said recess and, in the process, positions itself against the inner surface of the recess and is formed plastically and/or elastically. Since the upper sealing tool is preferably heated the upper film is heated essentially by thermal conduction. A small amount of heating is possibly also provided by radiant heat emanating from the upper sealing tool according to the invention.

The invention, then, provides for the maximum cross section of the recess to be smaller than the maximum cross section of the recess of the pack cavity. Therefore, a dome of comparatively small maximum cross section is formed in the upper film and/or it is possible for the transition region, in particular the first portion thereof, to be provided with a comparative large radius of curvature, this making it possible to form a cold upper film and/or to achieve a very good enclosure of the pack contents or abutments against the pack cavity without significant creasing occurring.

According to a further subject matter according to the invention, or preferred subject matter of the present invention, the internal diameter of the recess corresponds essentially to the maximum dimension of the cross section of the pack contents.

What is said in relation to this subject matter of the present invention applies equally to the other subjects, and vice versa.

The intention here is for the recess not to come into contact with the pack contents, but to follow the contour thereof, in particular the circumference, in particular vertical circumference, thereof, as precisely as possible. The distance between the recess and the outer circumference of the pack contents should preferably be 2-30 mm, particularly preferably 4-15 mm and most preferably 4-6 mm.

Yet another subject matter of the present invention is a packaging machine in which the upper film is formed, but which has no preheating step and/or no prestretching/predeforming step for the upper film and/or has no lateral guidance for the upper film.

What is said in relation to this subject matter of the present invention applies equally to the other subjects, and vice versa.

The packaging machine according to the invention for producing so-called skin packs is of comparatively straightforward design and is comparatively energy-efficient, because it is possible to dispense with a preheating step and/or prestretching/predeforming step for the upper film. At least at the beginning of the deformation of the upper film, the latter is planar and is preferably not heated by an upstream heater. The prior art provides such a preheating and/or prestretching step upstream of the sealing station. The upper sealing tool according to the invention, however, is part of the sealing station.

Another subject matter of the present invention is therefore a packaging machine which has the upper sealing tool according to the invention.

The sealing station preferably has upper sealing tool, for example a sealing frame, which in addition, following and/or during the skin-sealing operation, provides a sealing seam between the upper film and the pack cavity, said sealing seam extending along the entire circumference of the pack cavity. This at least ensures that the upper film is tightly connected to the pack cavity at all points all the way round and also any creasing present is smoothed more or less flat at least in the region of the sealing seam and cannot result in any leakages. It is often also the case that the pack then has a more pleasing appearance.

Another subject matter of the present invention is a method for producing a skin pack, in the case of which a cold and/or non-preheated and/or planar upper film web is drawn into the recess of an upper sealing tool, and formed and heated in the process, and then is pushed in the direction of a pack cavity filled with pack contents, in the process enclosing the pack contents and being connected over a large surface area to the pack cavity.

In the case of this method according to the invention, it is also possible for the pack cavity to be planar or essentially planar, i.e. not thermoformed.

What is said in relation to the packaging machine according to the invention applies equally to the method according to the invention, and vice versa.

The method according to the invention produces a skin pack i.e. a pack in which the upper film tightly encloses the pack contents and is connected over a large surface area to the pack cavity. Large surface area within the context of the invention means that the surface area of the sealing seam is greater than in the case of sealing using a sealing frame. According to the invention, prior to being deformed, the upper film is at ambient temperature, rather than being heated in an upper sealing tool. Furthermore, the upper film, rather than being preformed, is planar upstream of the sealing tool, as seen in the movement direction of the upper film. It is only in the upper sealing tool that the portion of the upper film, which will become part of the resulting pack, is first of all deformed and then heated over its entire surface area. For deformation purposes, a negative pressure is generated between the upper sealing tool and the upper film, said negative pressure drawing the upper film in the direction of the recess of the upper sealing tool.

There is preferably a certain amount of waiting time before the negative pressure which draws the upper film into the recess, is applied.

During and/or after the operation of the upper film being formed in the upper sealing tool, a negative pressure is generated between the upper film and the pack cavity, and preferably also beneath the pack cavity. As soon as, or once, the upper film has been formed in the recess, the negative pressure above the upper film is dissipated and the negative pressure beneath the upper film draws the latter in the direction of the pack contents and causes the upper film to enclose the pack contents at least to some extent in a form-fitting manner. Since the upper film has been heated in the recess of the upper sealing tool, it is connected over a large surface area, and integrally, to the pack cavity, preferably along the entire pack-cavity surface which is directed towards the upper film and is not covered by the pack contents. This sealing is preferably peelable.

It is preferably the case, in addition, that sealing is carried out between the upper film and the pack cavity using a sealing frame and/or the upper sealing tool. This sealing extends preferably along a horizontal surface along the periphery of the pack. This sealing may be peelable.

The invention will be explained hereinbelow with reference to FIGS. 1-6. These explanations are merely by way of example and do not limit the general concept of the invention. These explanations apply in equal measure to all the subjects according to the present invention.

BRIEF DESCRIPTION OF THE DRAWINGS

FIG. 1 shows the packaging machine according to the invention.

FIGS. 2A and 2B show the skin-packaging method using a prior art upper tool.

DETAILED DESCRIPTION

Figure 3:
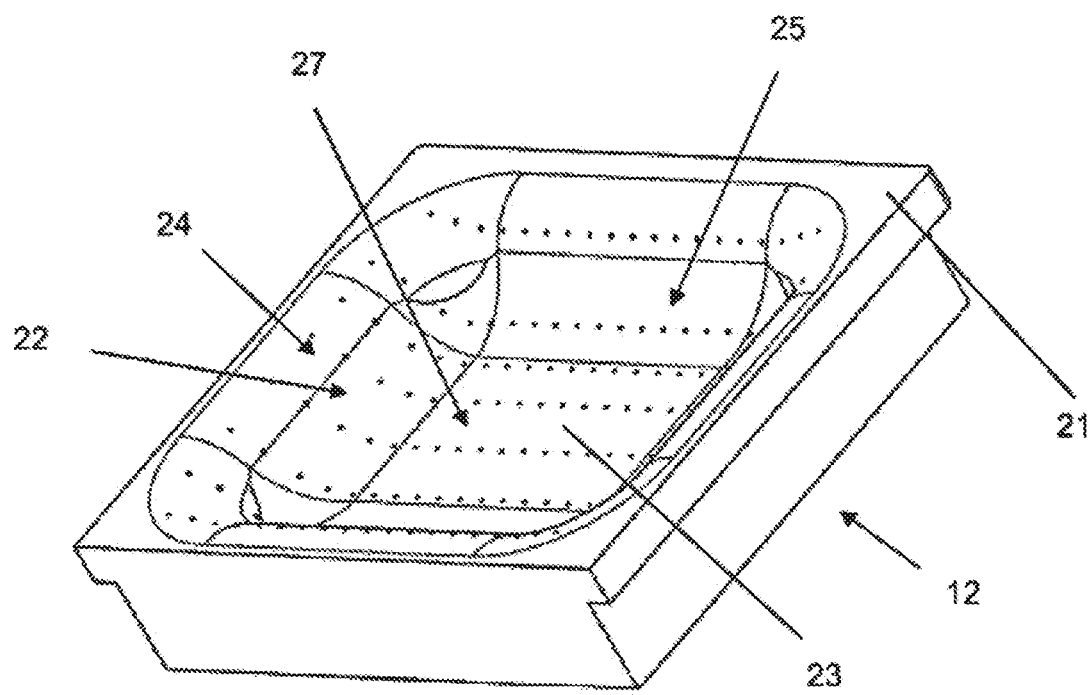
FIGS. 3-6 show the upper sealing tool according to the invention.

FIG. 1 shows an embodiment of the packaging machine 1 according to the invention, which in this case has a thermoforming station 2, a filling station 7 and a sealing station 15. A material web 8, in this case a plastic-film web 8, the so-called lower web, is drawn off from a supply roll and transported from right to left, preferably cyclically, along the packaging machine according to the invention. In one cycle, the material web 8 is transported onwards by one format length. For this purpose, the packaging machine has two transportation means, in the present case in each case two endless chains, which are arranged to the right and left of the film web. Both at the start and at the end of the packaging machine, in each case at least one gearwheel is provided for each chain, the respective chain being deflected around the gearwheel. At least one of these gearwheels is driven. The gearwheels in the entry region 19 and/or in the exit region can be connected to one another, preferably by a rigid spindle. Each transporting means usually has a multiplicity of clamping means, which grip the material web 8 with damping action in the entry region 19 and transmit the movement of the transporting means to the lower film 8. The clamping connection between the transporting means and the material web 8 is released again in the exit region of the packaging machine. The pack cavities 6 are formed in the film web 8 in the thermoforming station 2, which has an upper tool 3 and a lower tool 4, which exhibits the shape of the pack cavity which is to be produced. The lower tool 4 is arranged on a lifting table 5, which can be adjusted vertically, as is symbolized by double arrow. Prior to each film-advancement operation, the lower tool 4 is lowered and then raised again. As operation of the packaging machine continues, the pack cavities are then filled with the pack contents 16 in the filling station 7. In the following sealing station 19, which likewise comprises an upper tool 29 and a vertically adjustable lower tool 28, an upper film 14 is fastened integrally by being sealed to the material web 8. It is also the case in the sealing station that the upper tool and/or the lower tool are/is lowered and raised, respectively, before and after each film-transporting operation. Prior to the upper film 14 being sealed to the lower film 8, a certain negative pressure is generated in the filled pack cavity, said negative pressure, in the present case, drawing the upper film onto the pack cavity. As operation of the packaging machine continues, the completed packs are separated, which in the present case takes place by means of the cross cutter 18 and the longitudinal cutter 17. In the present case, the cross cutter 18 can likewise be raised and lowered by means of a lifting device 9.

A dome is formed in the planar upper film by means of the upper sealing tool 12, which constitutes the forming and preferably interchangeable tool within the upper tool 29, which has a recess 27 (see FIGS. 3-6). For this purpose, a negative pressure is applied, at the upper sealing tool, between the tool and the upper film, said negative pressure positioning the upper film against the tool and/or drawing it into the recess 27 of the upper sealing tool. Furthermore, the upper sealing tool is heated, at least in part. As soon as the previously non-heated upper film comes into contact with the upper sealing tool, it is heated to the desired temperature, this being beneficial for its deformation and subsequent sealing to the pack cavity.

It can be seen with reference to FIG. 1 that, prior to entering into the sealing station 15, the upper film 14 is neither heated nor preformed. In addition, it is also the case that the upper film is not guided in the region of the sealing station or upstream thereof.

FIGS. 2A and 28 show the operations in the sealing station. As soon as the pack cavity 6 and the upper film 14 are located in the sealing station, the upper tool 29 and the lower tool 28 are moved together and sealed in the peripheral region 30a, and the upper film and the pack cavity are clamped with a clamping tool 30. Then, as symbolized by the arrow 13, a negative pressure is applied between the upper sealing tool 12 and the upper film, said negative pressure drawing the upper film in the direction of the upper sealing tool, which is symbolized by the arrows 10, and therefore the upper film positions itself gradually against the upper sealing tool. The heated upper sealing tool transmits its heat here to the upper film, which up to this point in time has not been heated up, or at most has been heated up by a radiant heat in the sealing station. During or after the forming operation of the upper film, a negative pressure is created in the space between the upper film 14 and the pack contents 16, said negative pressure corresponding preferably to the negative pressure above the upper film. As soon as the upper film has been sufficiently heated and/or formed, or following an additional waiting time, the space above the upper film has air admitted to it or it is even the case that a positive pressure 20 is generated, for example using compressed air, and therefore at least ambient pressure prevails there, at least following a comparatively short period of time. The difference in pressure present causes the upper film to be pushed onto the pack contents and the free surface area of the pack cavity, this being illustrated in the lower part of the figure. The heated upper film 14 encloses the pack contents in a form-fitting manner and is connected integrally to the free surface area of the pack cavity. When comparing the figures here to FIGS. 3-6, a person skilled in the art will see that the tool illustrated here is a tool according to the prior art, because the transition region of the recess 27 has no convex portion and/or because the maximum cross section of the recess corresponds essentially to the maximum cross section of the pack cavity and/or because the transition between the peripheral region of the upper sealing tool to the transition region of the recess is provided in a sharp-edged state.

FIGS. 3-6 show the upper sealing tool 12 according to the invention having, on its side which is directed towards an upper film, a peripheral region 21 and a recess 27. A person skilled in the art will understand that the tool according to FIGS. 5 and 6 has been illustrated in a state in which it is rotated through 180° in relation to the use position. In the peripheral region, the upper sealing tool is pushed onto the upper film 14 and provides sealing against the upper film 14. It is also usually the case that the maximum cross section of the recess 27 is located in the plane of the peripheral region. The inner circumference of the peripheral region 21 is adjoined by the transition region 22 of the recess 27. Said transition region has a first, convex portion 24 with a radius of curvature R1 and a second, concave portion 25 with a radius of curvature R2. In the present case, the two portions extend over the entire circumference of the recess 27. This is preferred, but is not imperative. It is possible, for example for one or both regions 24, 25 to extend merely along the longer side of the rectangle of the recess. The radius of curvature R2 is preferably greater than the radius of curvature R1. The inner region 23 extends from the inner circumference of the transition region. Said inner region is preferably essentially planar and extends parallel to the peripheral region 21. The difference in height between the inner region 23 and the peripheral region defines the depth T of the recess. The radius of curvature R1 is preferably configured such that it will also increase as the depth T increases.

Figure 4:
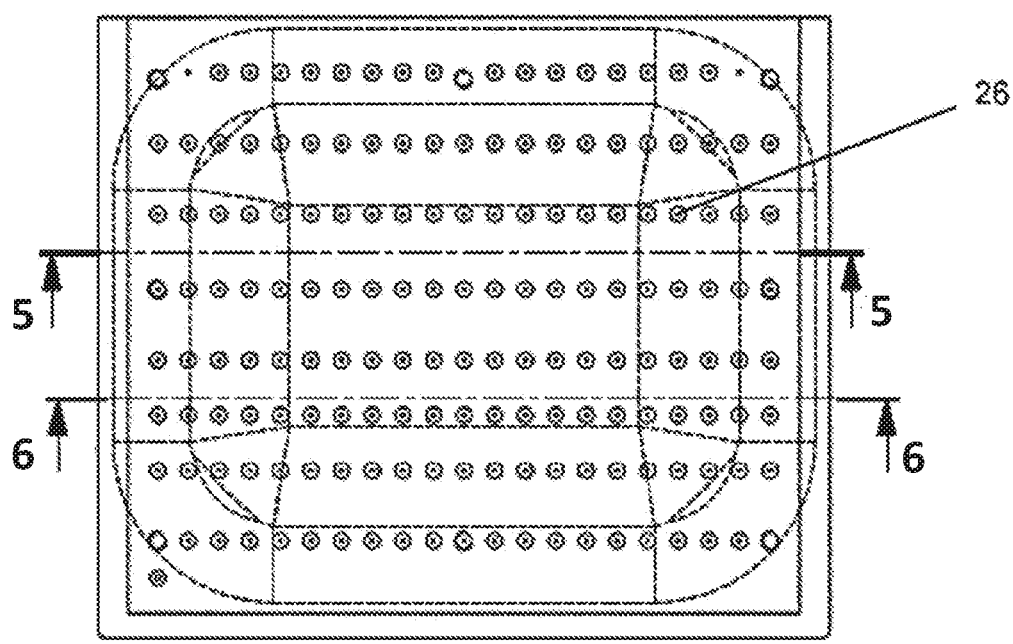
Figure 5:
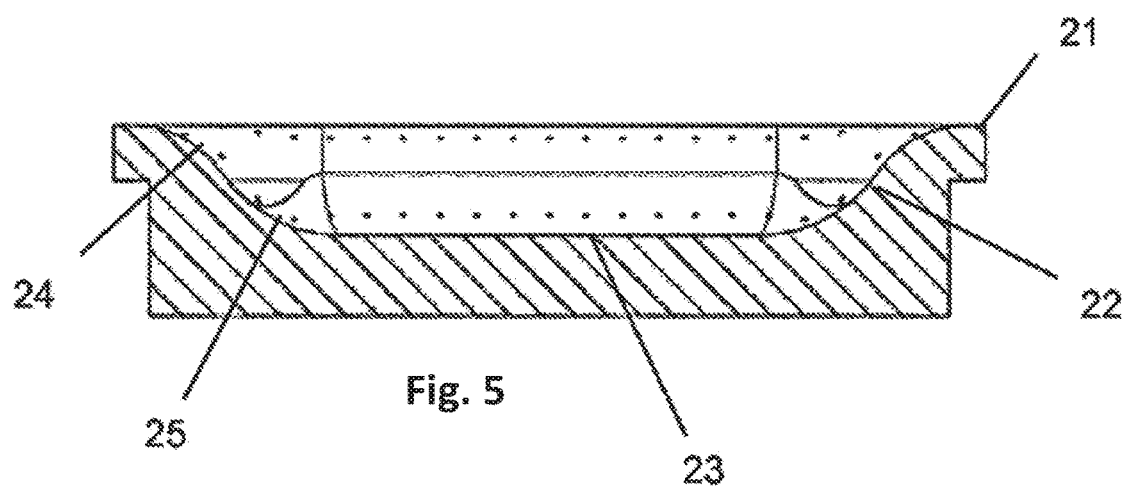
Figure 6:
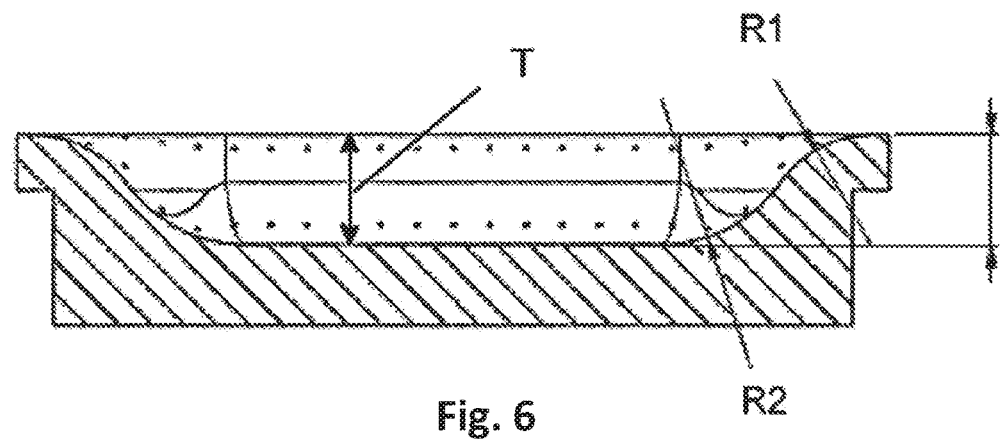

As can be gathered, in particular, from FIGS. 3 and 4, the upper sealing tool 12, in particular the region of the recess 27, has a multiplicity of bores 26. Air can be extracted by suction through said bores 26, it therefore being possible to produce, between the upper sealing tool and the upper film, a negative pressure which forms the upper film and generates for full-surface-area contact between the upper sealing tool and the upper film. Through these bores, the space between the upper sealing tool and the upper film then also has air admitted to it again and/or is provided with a positive pressure.

In particular the configuration of the transition region can give rise to a cold upper film being thermoformed. The deformation of the upper film here is very uniform and no over-stretching or tearing of the upper film occurs. The upper film positions itself over its entire surface area against the recess 22 and is thus heated uniformly. This makes it possible to dispense with a preheating step or a predeforming step of the upper film, even if the recess 27 has a depth T of more than 20-30 mm, in particular 40-55 mm. It is also the case that there is no need for the upper film to be guided laterally. This means that a corresponding packaging machine can be of relatively straightforward design and the entire packaging operation is energy-efficient.

LIST OF REFERENCE SIGNS

1 Packaging machine
2 Forming station, thermoforming station
3 Upper tool of the thermoforming station
4 Lower tool of the thermoforming station
5 Lifting table, supports of a tool of the sealing or thermoforming station and/or of the cutting device
6 Pack cavity
7 Filling station
8 Film web, lower film web
9 Lifting device
10 Forming, stretching of the upper film, positioning against the product and the pack cavity
11 Lower sealing tool of the sealing station
12 Upper sealing tool of the sealing station/sealing frame
13 Negative pressure
14 Upper film web, skin film
15 Sealing station
16 Pack contents
17 Longitudinal cutter
18 Cross cutter
19 Entry region
20 Admission of air, positive pressure
21 Peripheral region
22 Transition region
23 Inner region
24 First portion
25 Second portion
26 Gas through-passage, aperture, bore
27 Recess
R1 Radius in the first transition region
R2 Radius in the second transition region
28 Lower tool of the sealing station
29 Upper tool of the sealing station
30 Surrounding housing/damping tool of the sealing station
30*a* Peripheral region/damping region of the surrounding housing

The invention claimed is:

1. An upper sealing tool comprising:
a peripheral region and a recess, by way of which an upper film web is formed,
wherein the recess has a transition region and an inner region, and
wherein the recess has a depth measured between the peripheral region and the inner region,
wherein the transition region has a first portion and a second portion,
wherein the first portion is provided in a convex state and the second portion is provided in a concave state,
wherein a ratio of the depth of the recess to a radius of curvature of the first portion is ≤2.5, and wherein a ratio of the depth of the recess to a radius of curvature of the second portion is ≤2.5.

2. The upper sealing tool as claimed in claim 1, wherein each of the radius of curvature of the first portion and the radius of curvature of the second portion is ≥8 mm.

3. The upper sealing tool as claimed in claim 1, wherein the first portion and the second portion comprise curved surfaces.

4. The upper sealing tool as claimed in claim 1, wherein the radii of the first and second portions merge one into the other.

5. The upper sealing tool as claimed in claim 1, wherein the radius of curvature of the first portion is smaller than the radius of curvature of the second portion.

6. The upper sealing tool as claimed in claim 1, wherein the upper sealing tool has apertures and/or is made of a porous material.

7. The upper sealing tool as claimed in claim 1, wherein the depth of the recess is more than 30 mm.

8. The upper sealing tool as claimed in to claim 1, wherein the ratio of the depth of the recess to the radius of curvature of the first portion is ≤1 and the ratio of the depth of the recess to the radius of curvature of the second portion is ≤1.

9. The upper sealing tool as claimed in claim 1, wherein each of the radius of curvature of the first portion and the radius of curvature of the second portion is ≥8 mm.

10. The upper sealing tool as claimed in claim 1, wherein each of the radius of curvature of the first portion and the radius of curvature of the second portion is ≥15 mm.

11. The upper sealing tool as claimed in claim 1, wherein each of the radius of curvature of the first portion and the radius of curvature of the second portion is ≥20 mm.

12. The upper sealing tool as claimed in claim 1, wherein each of the radius of curvature of the first portion and the radius of curvature of the second portion is ≥30 mm.

* * * * *